(12) United States Patent
Hathiramani et al.

(10) Patent No.: US 12,408,156 B2
(45) Date of Patent: Sep. 2, 2025

(54) SWITCHING MONITORING BETWEEN SEARCH SPACE GROUPS

(71) Applicant: Nokia Technologies Oy, Espoo (FI)

(72) Inventors: Navin Hathiramani, Coppell, TX (US); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 396 days.

(21) Appl. No.: 18/040,732

(22) PCT Filed: Jul. 23, 2021

(86) PCT No.: PCT/EP2021/070676
§ 371 (c)(1),
(2) Date: Feb. 6, 2023

(87) PCT Pub. No.: WO2022/033838
PCT Pub. Date: Feb. 17, 2022

(65) Prior Publication Data
US 2023/0319801 A1   Oct. 5, 2023

Related U.S. Application Data

(60) Provisional application No. 62/706,415, filed on Aug. 14, 2020.

(51) Int. Cl.
*H04W 72/0453* (2023.01)
*H04W 72/23* (2023.01)
(Continued)

(52) U.S. Cl.
CPC ....... *H04W 72/0453* (2013.01); *H04W 72/23* (2023.01); *H04B 17/309* (2015.01); *H04L 5/0053* (2013.01)

(58) Field of Classification Search
CPC .............. H04W 72/0453; H04W 72/23; H04B 17/309; H04L 5/0053
See application file for complete search history.

(56) References Cited

U.S. PATENT DOCUMENTS 11,405,826 B2    8/2022   Hathiramani
2015/0280882 A1*  10/2015  Lee .......................... H04L 5/001
                                                                    370/329

(Continued)

FOREIGN PATENT DOCUMENTS

WO    2020/145748 A1    7/2020

OTHER PUBLICATIONS

Office Action for corresponding Japanese Patent Application No. 2023-511571, Feb. 5, 2024, (4 pages), English translation/summary (10 pages), 14 pages total.

(Continued)

*Primary Examiner* — Omar J Ghowrwal
(74) *Attorney, Agent, or Firm* — Carter, DeLuca & Farrell LLP

(57) ABSTRACT

A method, apparatus, and a computer-readable storage medium are provided for a time domain adaptation of multi-carrier PDDCH monitoring mechanism. A method, apparatus, and a computer-readable storage medium are provided for a time domain adaptation of multi-carrier PDDCH monitoring mechanism. In an example implementation, the method may include a user equipment receiving configuration information configuring one or more search space groups for each of a plurality of scheduling carriers, the one or more search space groups including at least a first search space group on a first carrier and at least a second search space group on a second carrier; monitoring, by the user equipment, at least the first search space group. The method may further include detecting whether a condition to switch from the first search space group to the second search (Continued)

space group is satisfied and switching the monitoring from the at least first search space group to the at least second search space group in response to the detecting that the condition is satisfied.

1 Claim, 8 Drawing Sheets

(51) Int. Cl.
 H04B 17/309 (2015.01)
 H04L 5/00 (2006.01)

(56) References Cited

U.S. PATENT DOCUMENTS

2020/0280971 A1* 9/2020 Moon .................. H04L 5/0053
2022/0416987 A1* 12/2022 Takeda .................. H04L 5/001

OTHER PUBLICATIONS

"SCell scheduling Pcell", 3GPP TSG RAN WG1 #102-e, R1-2006473, Agenda: 8.13.1, InterDigital, Inc., Aug. 17-28, 2020, pp. 1-3.
"Cross-carrier scheduling from SCell to Pcell", 3GPP TSG RAN WG1 #102-e, R1-2006176, Agenda: 8.13.1, Samsung, Aug. 17-28, 2020, 5 pages.
"Discussion on physical DL channel design in unlicensed spectrum", 3GPP TSG RAN WG1 #99, R1-1912010, Agenda: 7.2.2.1.2, vivo, Nov. 18-22, 2019, 10 pages.
"Discussion on cross-carrier scheduling for NR DSS", 3GPP TSG RAN WG1 #102-e, R1-2006362, Agenda: 8.13.1, ETRI, Aug. 17-28, 2020, pp. 1-3.
Office Action for corresponding Japanese Patent Application No. 2023-511571, dated Aug. 5, 2024, (3 pages), English Translation/summary (6 pages), 9 pages total.
"3rd Generation Partnership Project; Technical Specification Group Radio Access Network; NR; Physical layer procedures for control (Release 16)", 3GPP TS 38.213, V16.2.0, Jun. 2020, pp. 1-176.
"New WID on NR Dynamic spectrum sharing (DSS)", 3GPP TSG RAN Meeting #86, RP-193260, Agenda: 9.1.1, Ericsson, Dec. 9-12, 2019, 4 pages.
"New SID on support of reduced capability NR devices", 3GPP TSG RAN Meeting #86, RP-193238, Agenda: 9.1.1, Ericsson, Dec. 9-12, 2019, 5 pages.
"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
International Search Report and Written Opinion received for corresponding Patent Cooperation Treaty Application No. PCT/EP2021/070676, dated Oct. 14, 2021, 14 pages.
"Agreements from email discussion [100e-NR-unlic-NRU-DL_Signals_and_Channels-03] on search space set monitoring/switching", 3GPP TSG RAN WG1#100e, R1-2001389, Agenda: 7.2.2.1.2, Motorola Mobility, Feb. 24-Mar. 6, 2020, 32 pages.
"[H226] TP for search space group switching for CSS", 3GPP TSG-RAN WG2 Meeting #109bis-e, R2-2003638, Agenda: 6.0.1, Huawei, Apr. 20-May 1, 2020, 7 pages,.

* cited by examiner

SWITCHING MONITORING BETWEEN SEARCH SPACE GROUPS

RELATED APPLICATION

This application was originally filed as PCT Application No. PCT/EP2021/070676, filed on Jul. 23, 2021, which claims priority from U.S. Application No. 62/706,415, filed on Aug. 14, 2020, each of which is incorporated herein by reference in its entirety.

TECHNICAL FIELD

This description relates to wireless communications, and in particular, monitoring of search spaces.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra reliable low latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for a time domain adaptation of multi-carrier PDDCH monitoring mechanism. In an example implementation, the method may include a user equipment receiving configuration information configuring one or more search space groups for each of a plurality of scheduling carriers, the one or more search space groups including at least a first search space group on a first carrier and at least a second search space group on a second carrier; monitoring, by the user equipment, at least the first search space group. The method may further include detecting whether a condition to switch from the first search space group to the second search space group is satisfied and switching the monitoring from the at least first search space group to the at least second search space group in response to the detecting that the condition is satisfied.

In an additional example implementation, the method may include a network node (e.g., a gNB) transmitting configuration information to a user equipment for configuring one or more search space groups for each of a plurality of scheduling carriers at the user equipment, the one or more search space groups including at least a first search space group on a first carrier and at least a second search space group on the second carrier. The method may further include determining whether a condition to switch from the first search space group to the second search space group is satisfied and transmitting a physical downlink control channel to the user equipment in at least the second search space group on the second carrier.

DETAILED DESCRIPTION

Figure 1:
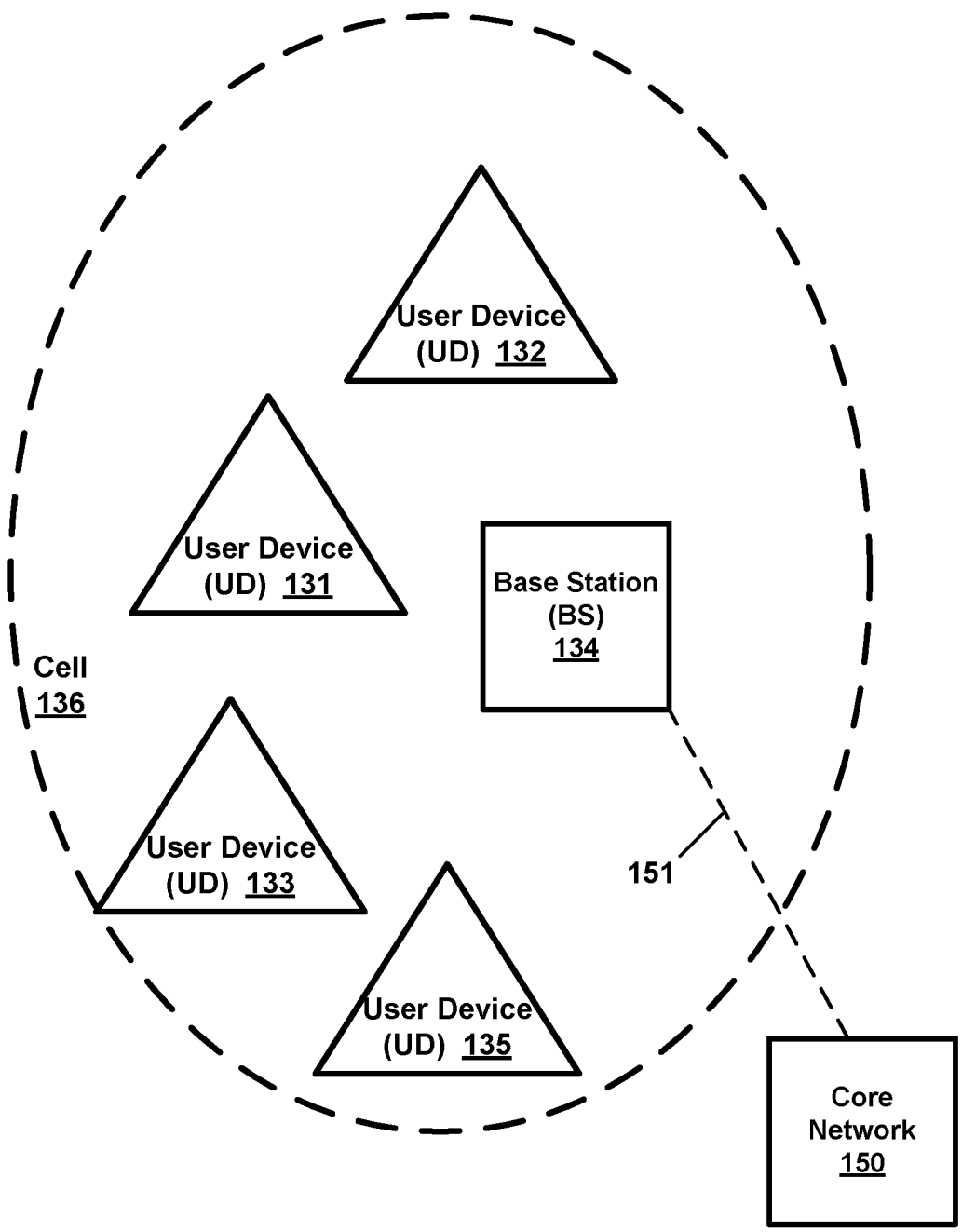
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In 3GPP Rel-16 TS 38.213, it states that a UE does not expect to monitor a physical downlink control channel (PDCCH) candidates on an active downlink (DL) bandwidth part (BWP) of a secondary cell if the UE is configured to monitor PDCCH candidates with carrier indicator field corresponding to that secondary cell in another serving cell. In Rel-17 work item (WI) RP-193260, the baseline assumption is that Pcell would be scheduled only from Scell upon configuration, e.g., only one scheduling cell based on configuration. However, such approach may not be optimal due to several issues, for example, Scell may be missing recovery procedures as there should exist a fallback procedure to Pcell during times where link quality deteriorates on Scell, etc.

PDCCH decoding, from a UE perspective, is demanding in terms of compute resources, and blind decoding (BD)/control channel element (CCE) limits of the UE are currently defined per "scheduled cell." In other words, the UE may determine limits per scheduled cell and counts BDs and CCEs across a search space set/search space on a scheduling cell. For example, for "NR light UEs" (RP-193238 Reduced Capability NR devices), it may be desirable to reduce the decoding computational complexity without sacrificing capacity gains from carrier aggregation (CA).

Therefore, there is a desire and/or need to exploit UE PDCCH monitoring capabilities on the scheduling carriers to ensure that UE's BD and CCE limits are not exceeded while minimizing the UE computational requirements for PDCCH decoding to operate above scenarios. In addition, the gNB may require multiple BDs and CCEs on the carrier from multiple carriers where it schedules the UE.

The present disclosure describes mechanisms for a time domain adaptation of multi-carrier PDCCH monitoring scheme in which a UE may be configured to monitor PDCCHs on at least two carriers per a single scheduled cell. Further, in order to avoid exceeding BD/CCE limits and/or focus BD/CCE capability within scheduling currently used, a time domain adaptation scheme is proposed via which the UE is made aware of the monitoring occasions in each of its configured scheduling cells. Furthermore, the UE may be configured (or enabled) to autonomously switch between monitoring search space groups (SSGs).

In an example implementation, the present disclosure describes a method, apparatus, and a computer-readable storage medium are provided for time domain multi-carrier PDDCH monitoring mechanism. In an example implementation, the method may include a user equipment receiving configuration information configuring one or more search space groups for each of a plurality of scheduling carriers, the one or more search space groups including at least a first search space group on a first carrier and at least a second search space group on a second carrier; monitoring, by the user equipment, at least the first search space group. The method may further include detecting whether a condition to switch from the first search space group to the second search space group is satisfied and switching the monitoring from the at least first search space group to the at least second search space group in response to the detecting that the condition is satisfied. In an additional example implementation, the method may include a network node (e.g., a gNB) transmitting configuration information to a user equipment for configuring one or more search space groups for each of a plurality of scheduling carriers at the user equipment, the one or more search space groups including at least a first search space group on a first carrier and at least a second search space group on the second carrier. The method may further include determining whether a condition to switch from the first search space group to the second search space group is satisfied and transmitting a physical downlink control channel to the user equipment in at least the second search space group on the second carrier.

Figure 2:
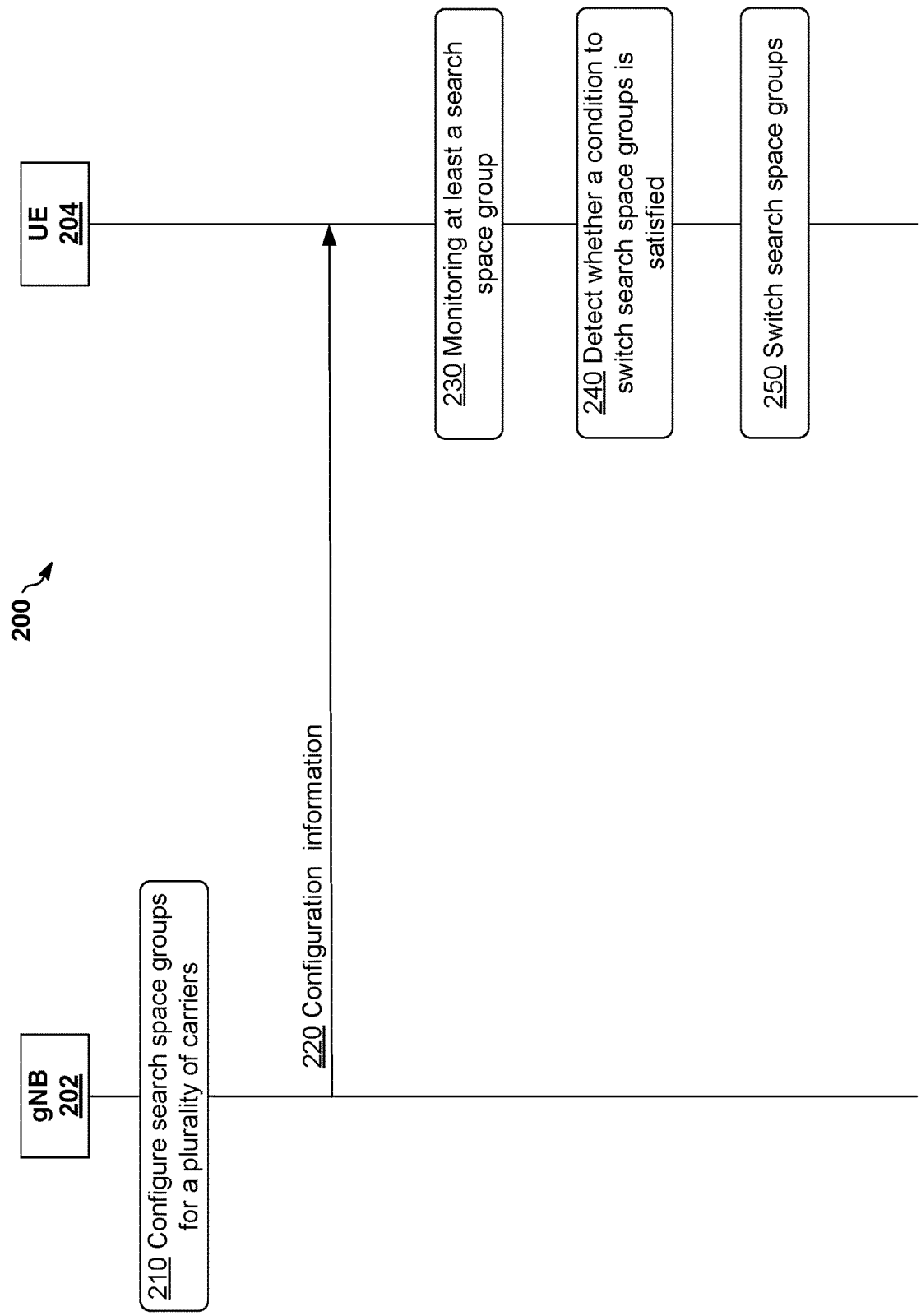
FIG. 2 illustrates an autonomous search space group switching, according to an example implementation.

FIG. 2 illustrates an autonomous search space group switching 200, according to an example implementation.

In an example implementation, at 210, a gNB, e.g., gNB 202, which may be same or similar to BS 134 of FIG. 1, may configure search spaces.

At 220, gNB 202 may send configuration information to a UE, e.g., UE 204, which may be same or similar to user device 131 of FIG. 1. In some implementations, for example, the configuration information may provide information related to configuring search space groups (SSGs) for a plurality of scheduling carriers. In some implementations, for example, the plurality of scheduling carriers may schedule a single scheduled carrier (e.g., also referred to as a cell or a serving cell).

At 230, UE 204 may monitor the configured SSGs for the plurality of scheduling carriers. In some implementations, the UE may be configured with the SSGs for the plurality of carriers based at least on the configuration information received from the gNB. The UE may be in a carrier aggregation (CA) mode and may be configured with a plurality of carriers or component carriers (CCs). In an example implementation, the UE in CA mode may be configured with a primary cell (Pcell) and one or more secondary cells (e.g., Scell #1, Scell #2, etc.), each comprising one component carrier, where the carriers may belong to licensed and/or unlicensed frequency bands.

In an example implementation, the UE may be configured with SSGs for each of the scheduling carriers. An SSG may be generally defined by a plurality of search spaces (SSs) for monitoring PDCCH by the UE.

In some implementations, for example, to simplify the decoding task at the UE, the whole control region may be sub-divided into a common search space (CSS) and UE-specific search spaces (USS) which the UE should monitor (e.g., attempt to decode each of the PDCCHs). The CSS may carry common control information and may be monitored by all UEs in a cell (e.g., gNB 202). In addition, the CSS may be used to carry important initial information, for example, paging information, system information, random access procedures, etc. It should be noted that the decoder starts decoding from the first CCE when searching the CSS to simplify the common search. The USS carries control information specific to a particular UE and may be monitored by at least one UE in a cell. Unlike CSS, the starting location of USS may vary for each subframe or UE. It should be noted that the starting location of the USS may be determined in every subframe using, for example, a hash function, as specified in TS 38.213.

In the USS, the UE may detect and decode a PDCCH by monitoring a set of PDCCH candidates (a set of consecutive CCEs on which PDCCH could be mapped) in every subframe. If no CRC error is detected when the UE uses its RNTI to demask the CRC (16-bit value also refers as C-RNTI) on a PDCCH, the UE determines that the PDCCH carries its own control information. The PDCCH candidates which a UE monitors are defined by configured search space sets, and different search space sets may be associated with different PDCCH formats. In some implementations, for example, a UE may be capable of monitoring a maximum of four different PDCCH formats at a given time.

In some implementations, the SSGs may be configured as a CSS or a USS. Alternatively, a CSS or a part of it may remain ungrouped and be always monitored. In an example implementation, the UE may be configured with SSG #0 and SSG #1 for the first scheduling carrier (e.g., Pcell) and SSG

0 and SSG #1 for the second scheduling carrier (e.g., Scell or Scell #1 in case a plurality of Scells are configured at the UE). In some implementations, for example, each of the SSGs may include one or more search spaces (SSs).

At 240, UE 204, may detect a trigger to change the monitored SSG. In other words, for example, the UE may detect whether a condition to switch SSGs is satisfied. In an example implementation, the condition may include determining that the user equipment is not detecting a pre-defined signal or a channel (e.g., PDCCH) on a scheduling carrier during a measurement occasion of the scheduled carrier. In another example implementation, the condition may include determining that the user equipment is detecting or reporting a channel quality indicator (CQI) below a threshold value during the measurement occasion of the scheduled carrier. In another example implementation, the condition may include determining that the user equipment is detecting a radio link failure (RLF) of a physical downlink control channel (PDCCH) during a measurement occasion of another scheduled carrier.

At 250, UE 204 may initiate switching SSGs. In some implementations, for example, the UE may switch SSGs for monitoring PDCCHs in response to determining that the condition is satisfied.

Thus, the above described mechanisms provide for autonomous search space group switching at the UE, which may be also known to a gNB.

Figure 3:
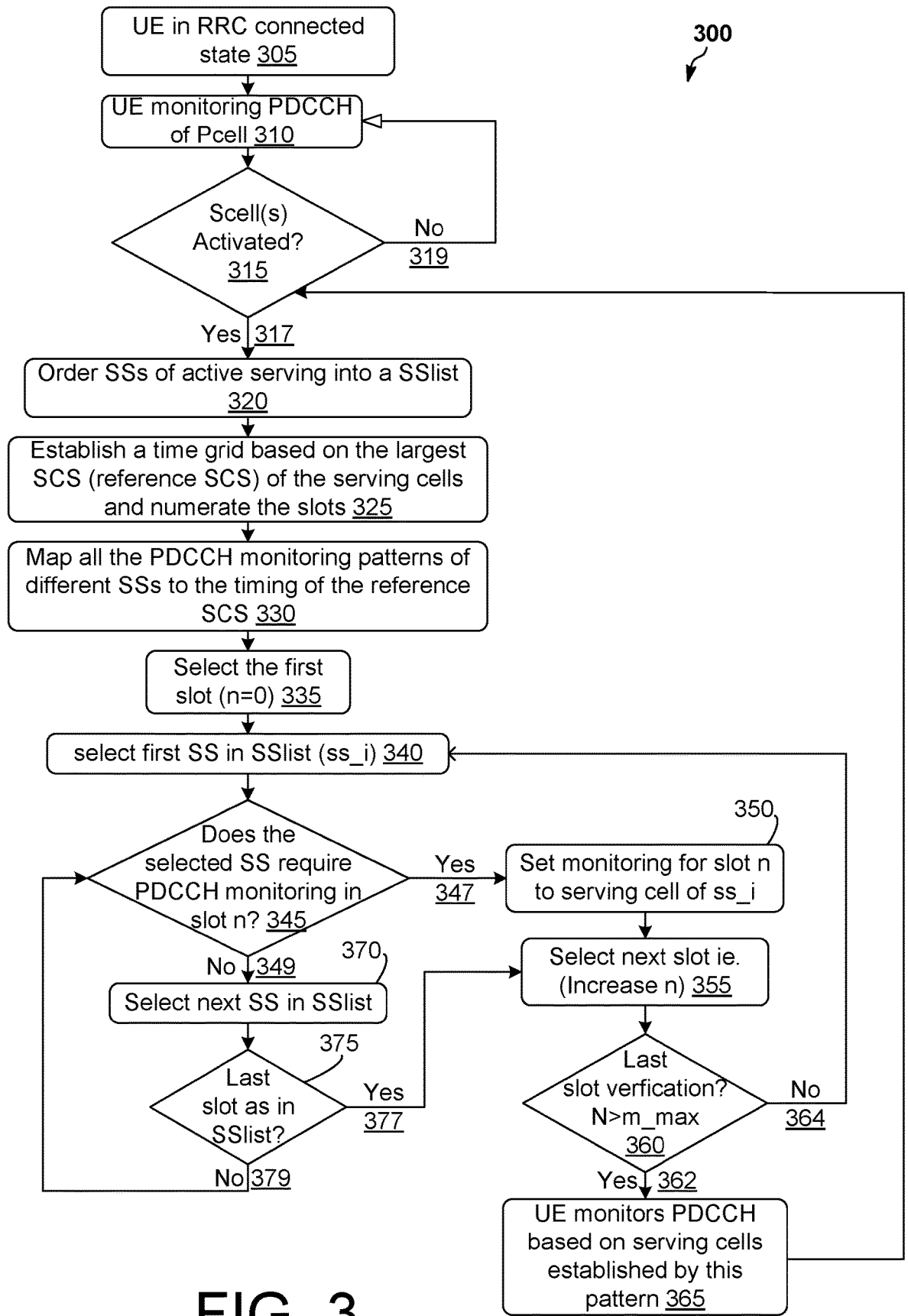
FIG. 3 illustrates a time domain adaptation multi-carrier PDDCH monitoring mechanism, according to an example implementation.

In addition, the present disclosure proposes a methodology to enable time domain adaptation of multi-carrier PDCCH monitoring, as described in detail in reference to FIG. 3. In an example implementation, the proposed methodology may include a UE in CA mode with at least 2 CCs (e.g., Pcell and Scell) which are configured with their own SSGs for CSS and USS.

Further, each configured search space for the serving cells (e.g., Pcell and Scells) may have associated monitoringSlotPeriodicityAndOffset and duration parameters as defined in 3GPP TS 38.213. The monitoring occasions of each search space of Pcell and Scell(s) are configured via RRC procedure.

In some implementations, for example, the configuration information for SS PDCCH monitoring may be modified to include additional fields, which may include at least the following: i) priority: the priority field may define the priority for SS monitoring in case of conflict with SS configured for other serving cells. The priority values may be different for SSs of different serving cells. An equal value of priority for several SSs of the same serving cell indicates that the UE may monitor all the SSs with the same priority on the slots where the monitoring occasions collide. In some implementations, for example, the priority may be semi-statically triggered and/or dynamically varying based on a criterion/criteria established by the Pcell. For example, the priority value may be configured based on channel quality indicator (CQI) thresholds, where the serving cell with the highest priority may establish the SS to be monitored by the UE. In some implementation, for example, hysteresis values may also be employed to avoid ambiguous scenarios and/or frequent switches between monitored SS of the serving cells. ii) cross-scheduled serving cells: this field may include a list of serving cells which may be scheduled by the scheduling cell for which the SS configuration is defined. Two examples of cross-carrier scheduling which may be configured include: a) UE is monitoring on the Pcell and the Pcell may perform cross-carrier scheduling of the Scells PDSCH/PUSCH and own cell scheduling of USS and CSS for the UE, and b) UE is monitoring on the Scell and the Scell could perform cross carrier scheduling of the Pcell PDSCH/PUSCH, other Scell PDSCH/PUSCH, and own cell scheduling of USS and CSS for the UE.

Further, in some implementations, for example, the gNB may indicate to the UE to monitor in the scheduling or non-scheduling DCI a SS group that is different in the at least two scheduling cells, as well as the gNB may indicate that no SS group is monitored in a scheduling cell. For example, the states listed below may be indicated for two scheduling cells. In addition, receiving a state change may satisfy a condition to switch from the first search space group to the second search space group. In some implementations second group may not contain any search-space-set, herein denoted as "None."

| State | Cell 1 | Cell 2 |
|---|---|---|
| 0 | SS Group 0 | SS Group 1 |
| 1 | SS Group 0 | None |
| 2 | None | SS Group 1 |

FIG. 3 illustrates a time domain adaptation of multi-carrier PDDCH monitoring mechanism 300, according to an example implementation.

In an example implementation, at 305, a UE, e.g., UE 204 of FIG. 2 may be in an RRC connected (e.g., RRC_CONNECTED) state. The UE, when it initially powers up is in an idle (e.g., RRC_IDLE) state and may move to RRC_CONNECTED state with an initial access or a connection establishment. If there is no activity from the UE (e.g., for a short time), the UE can release its RRC connection and move to RRC_IDLE or suspend its session and move to an RRC inactive (e.g., RRC_INACTIVE) state and can resume its session by moving back to RRC connected state.

At 310, UE 204 may start monitoring a configured search space group to receive a physical downlink control channel (PDDCH) of the Pcell.

At 315, UE 204 may determine whether any Scells are activated. In some implementations, the UE may detect that one or more Scells are activated. In an example implementation, the UE may detect the activation of one Scell (e.g., Scell #1). In another example implementation, the UE may detect the activation of two Scells (e.g., Scell #1 and Scell #2). These are just example implementations, and more than two Scells may be activated at the UE. In addition, in some implementations, the UE may determine whether any Scells are deactivated. The UE, in response to determining one or more Scells are activated/deactivated, for example, at 317, may proceed to 320 if at least one Scell is still activated. Otherwise, the UE may return to 310.

Alternately, at 319, in response to detecting that no Scells have been activated, the UE may proceed to 310 and continue monitoring PDCCH of the Pcell.

Figure 4:
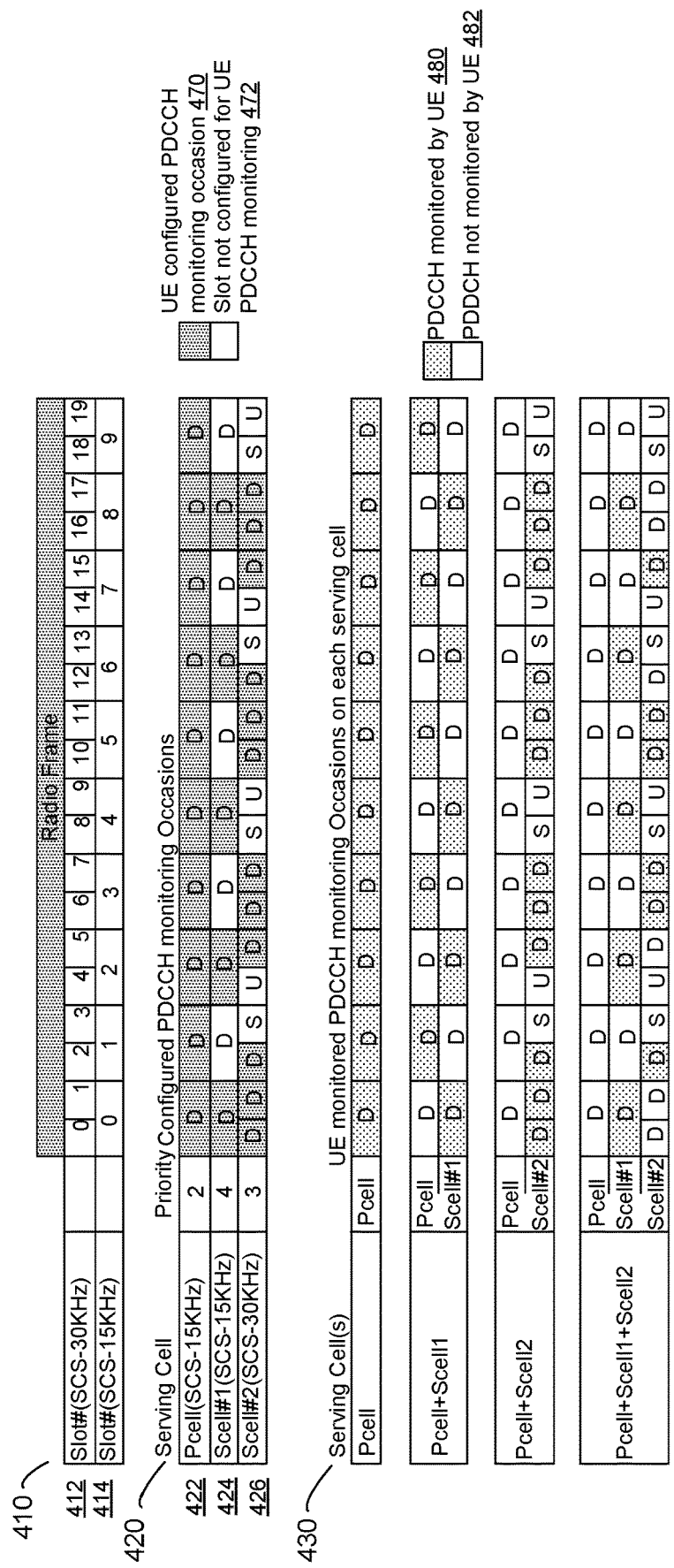
FIG. 4 illustrates a mechanism for determining PDCCH monitoring occasions, according to an example implementation.

At 320, UE 204 may order the search spaces (SSs) of the active serving cells (Scells). In some implementations, for example, UE 204 may order the SSs of the Pcell and Scell(s), and may create an ordered list, e.g., SSlist. In an example implementation, the SSlist may be created based on priority criterion/criteria established by the Pcell for the PDCCH monitoring pattern of each search space. In other words, the gNB may configure (e.g., preconfigure) the UE with the monitoring patterns based on the active SCells and their priorities. It should be noted that the modification of the active SCells, may result in revisiting the priorities since some Scells may not be active and may need to be dropped from the monitoring. For example, as illustrated in FIG. 4 in detail, the Pcell may be configured with a priority of 2, Scell #1 may be configured with a priority of 4, and Scell #2 may be configured with a priority of 3, where Scell #1 with the priority value of 4 has the highest priority of the serving cells. In some implementations, for example, SSs of the serving cells with the same priority may be ordered randomly or in a pre-determined order.

In an example implementation, Pcell may be configured with search spaces SS #1 and SS #2, Scell #1 may be configured with search spaces SS #3 and SS #4, and Scell #2 may be configured with search spaces SS #5 and SS #6. The UE, based on the priorities of the SSs of the serving cells may create the SSlist which may include SS #3, SS #4, SS #5, SS #6, SS #1, and SS #2 in an order.

At 325, UE 204 may establish a time grid based on, for example, the largest subcarrier spacing (SCS) of the serving cells and numerate the slots. In some implementations, for example, the UE may establish a time grid, as illustrated in detail in FIG. 4, based on 412 (e.g., SCS of 30 kHz, the largest SCS). In other words, the SSs may be configured with periodicity and monitoring occasions as described above which establishes the slots on which the PDCCH monitoring starts. The numerating of the slots may help align different PDCCH monitoring patterns which could also be for carriers with different SCSs as shown in FIG. 4.

At 330, UE 204 may map the PDCCH monitoring patterns configured for the serving cells to the established reference timing grid, as illustrated in detail by 430 of FIG. 4.

At 335, UE 204 may select the first slot (e.g., n=0).

At 340, UE 204 may select the first SS in the SSlist for the first slot to verify whether this SS is configured for transmission in the slot.

In some implementations, for example, it should be noted that the operations at 335 and 340 are repeated for every slot.

At 345, the UE may determine whether the selected SS requires PDCCH monitoring in the slot n. At 347, in response to a positive response at 345, the UE may proceed to 350.

At 350, UE 204 may set the monitoring for the given slot n to serving cell associated with the corresponding cell and proceed to 355.

At 355, UE 204 may proceed to the selection of the next slot.

In some implementations, for example, for mixed numerologies, as illustrated in FIG. 4, partial slot monitoring may be allowed, for example, Pcell+Scell #2 scenario: slots 2 and 3 based on SCS 30 kHz timing grid corresponding to Scell #2 downlink and special slots. For slot 2, the UE may determine, based on priority, to monitor Scell #2 and the partial slot monitoring may enable the UE to monitor the second half of SCS=15 kHz slot 1 that is slot 3 of SCS of 30 kHz.

Alternately, at 349, in response to a negative response at 345 (e.g., if the selected SS from the SSlist did not have monitoring configured for the selected slot), the UE proceeds to 370.

At 370, UE 204 may select the next SS from the SSlist and proceeds to 375.

At 375, UE may determine whether the SS is the last SS for the slot.

In response to receiving a positive response at 377, the UE may proceed to 355.

Alternately, in response to receiving a negative response at 379, the UE may proceed to 345.

Upon finalization of the process illustrated in FIG. 3, the UE may have a mapping on a per slot basis of which serving cell to monitor and which SS the UE should monitor in that slot. Upon changes in activated/deactivated Scells or the triggering of a criteria which impacts the monitoring priority, the process may restart at 315.

Thus, the above described mechanisms provide a time domain adaptation multi-carrier PDDCH monitoring mechanism.

FIG. 4 illustrates a mechanism for determining PDCCH monitoring occasions 400, according to an example implementation.

An example implementation with three serving cells/CCs with multiple numerologies and configured for CA for determining PDCCH monitoring occasions is illustrated in FIG. 4. It should be noted that each serving cell configured for cross-carrier scheduling may define its SS monitoring patterns and their priorities.

In FIG. 4, a gNB, e.g., gNB of 202, may be configured with three serving cells 420, e.g., a Pcell 422 and two Scells (Scell #1 424 and Scell #2 426). As shown in FIG. 4, Pcell 422, Scell #1 424, and Scell #2 426 may be configured with subcarrier spacings (SCSs) of 15 kHz, 15 kHz, and 30 kHz, respectively. In addition, Pcell 422, Scell #1 424, and Scell #2 426 may be configured with priorities of 2, 4, and 3, where Scell #2 has the highest priority. The priorities establish a method to determine a unique PDCCH monitoring pattern across the configured serving cells such that the UE is only required to monitor a single serving cell in a given slot, as illustrated by 410 (412 for slots with SCS of 30 kHz and 414 for slots with SCS of 15 kHz). The number of the time grid indicates the slot number, where "D" indicates a downlink slot, "U" indicated an uplink slot, and "S" indicates a special slot. In some implementations, for example, the priorities may be established dynamically or semi-statically configured (e.g., via RRC signaling) and a higher priority (e.g., a priority of 4 for Scell #2) may imply a higher priority for that serving cell's SS monitoring PDCCH pattern. In addition, media access control (MAC) control element (CE), MAC-CE, or downlink control information (DCI) may be used for modification of priorities or rules to determine the priorities if these priorities have previously been configured via RRC. For example, different sets of channel quality indicator (CQI) thresholds may be configured via RRC and then depending on the load in the cells, MAC-CE may be to switch between the two sets of CQI thresholds.

In an example implementation, it is assumed, for simplicity, that all SSs for each of the serving cells are configured with the same monitoring pattern and semi-static priorities. The PDCCH monitoring occasions configured by the network for each of the serving cells are shown by 470 and those not configured for monitoring are shown by 472. Additionally, the priorities associated with the serving cells are 2, 4 and 3, for Pcell, Scell #1 and Scell #2 respectively, which means that Scell #1 monitoring pattern has the highest priority followed by Scell #2 and then by the Pcell.

In the example implementation, the monitoring of PDCCH occasions for different possible configurations of these three serving cells are shown by slots 480 (and slots not monitored by the UE are shown by 482). For example, when the UE is configured with Pcell+Scell #1+Scell #2, the UE would not monitor Pcell for PDCCH, and Scell #1/Scell #2 monitoring occasions may be used to cross-schedule Pcell and the other Scell, i.e., either Scell #2 or Scell #1.

In another example implementation, when the UE is configured with Pcell and Scell #2, the UE would not monitor Pcell for PDCCH, and Scell #2 monitoring occasions may be used to cross-schedule Pcell.

Figure 5:
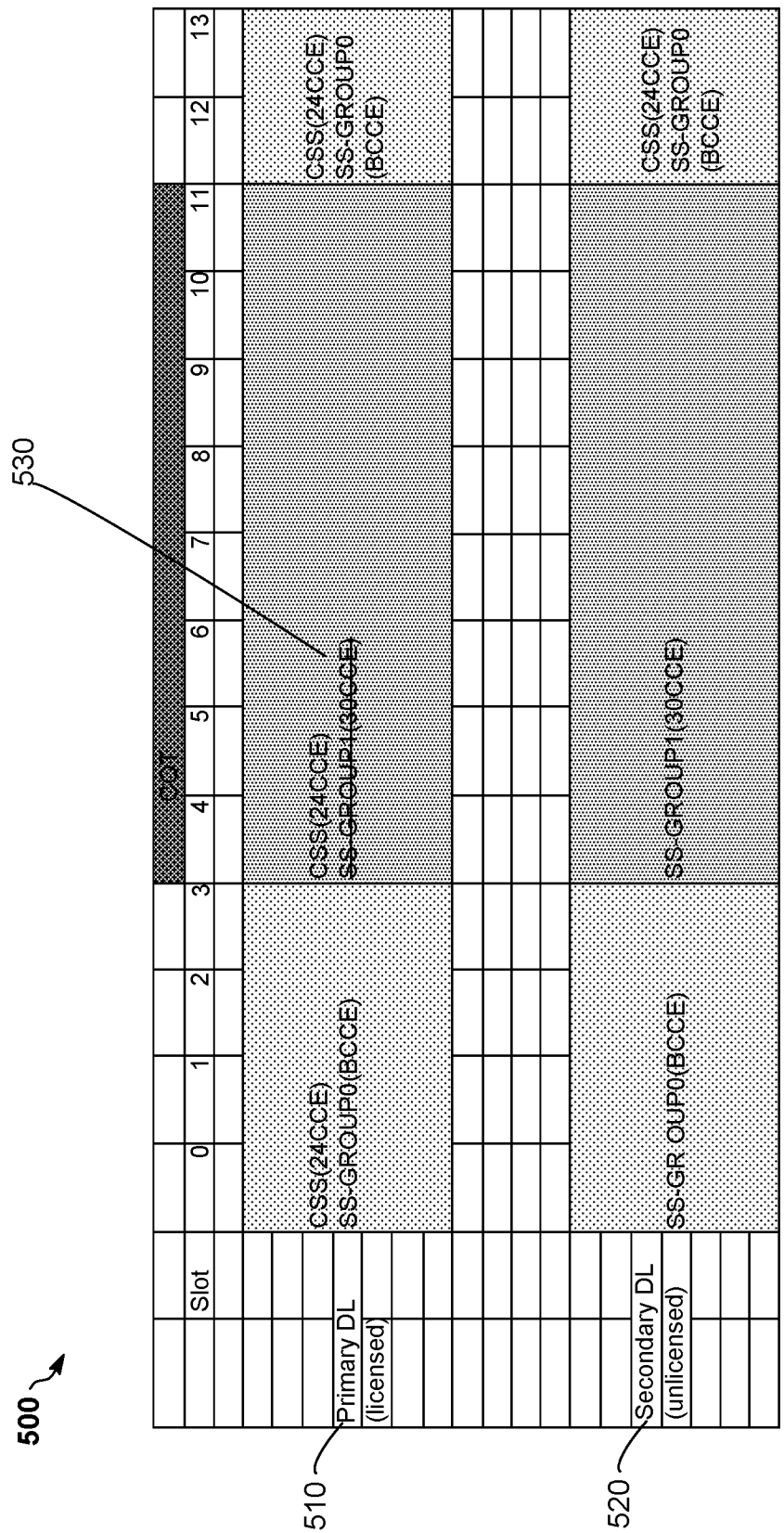
FIG. 5 illustrates an example implementation for NR-Unlicensed (NR-U), according to an example implementation.

FIG. 5 illustrates an example implementation for NR-Unlicensed (NR-U) 500, according to an example implementation.

In an example implementation, UE 204 may be configured with CSS on a primary scheduling carrier 510, which may be configured with licensed frequency (or licensed band). Further, on the primary scheduling carrier, SS Group 0 (SSG0) may be configured with Type-3 SS, as defined in 3GPP Specification, with a group common PDCCH (GC-PDCCH) 1 PDCCH candidate consuming 8 CCEs and SS Group 1 (SSG1) may be configured with USS search-space sets with PDCCH candidates consuming 30 CCEs. A GC-PDCCH may carry at least slot format related information (SFI). The slot format related information is defined as information from which the UE can derive at least which symbols in a slot that are DL, UL and other, respectively.

On the secondary scheduling carrier 520, which may be configured with unlicensed frequency, SS Group 0 (SSG0) may be configured with Type-3 SS with GC-PDCCH 1 PDCCH candidate consuming 8 CCEs and SS Group 1 (SSG1) configured with USS search-space sets with PDCCH candidates consuming 30 CCEs.

As illustrated in FIG. 5, when the UE receives GC-PDCCH in slot #4 on unlicensed scheduling carriers, the UE may abstain (indicated by strikethrough) from monitoring SS Group 1 in the licensed carrier as illustrated by 530. This may provide the gNB with scheduling flexibility, while CCE limit of 56 CCEs in NR (per 15 kHz and 30 kHz slot) is not exceeded.

Therefore, the proposed mechanisms provide the UE with monitoring occasions on Pcell and Scell which may be orthogonal in time and hence there are no UE requirements from UE perspective to simultaneously attempt decoding several carriers. This mechanism would also be beneficial from NR devices power savings and complexity point of view, enabling, for example, NR light devices access to higher capacity. From a network perspective, the proposed mechanism would enable flexible scheduling of the UEs by having the capability to dynamically load not only PDSCH/PUSCH between Pcell and Scells but also PDCCH. The proposed time domain adaptation scheme also enables the network to offload the scheduling of control messages. In other words, the proposed mechanisms provide low complexity approach for managing BDs in a target scenario with low specification effort.

Figure 6:
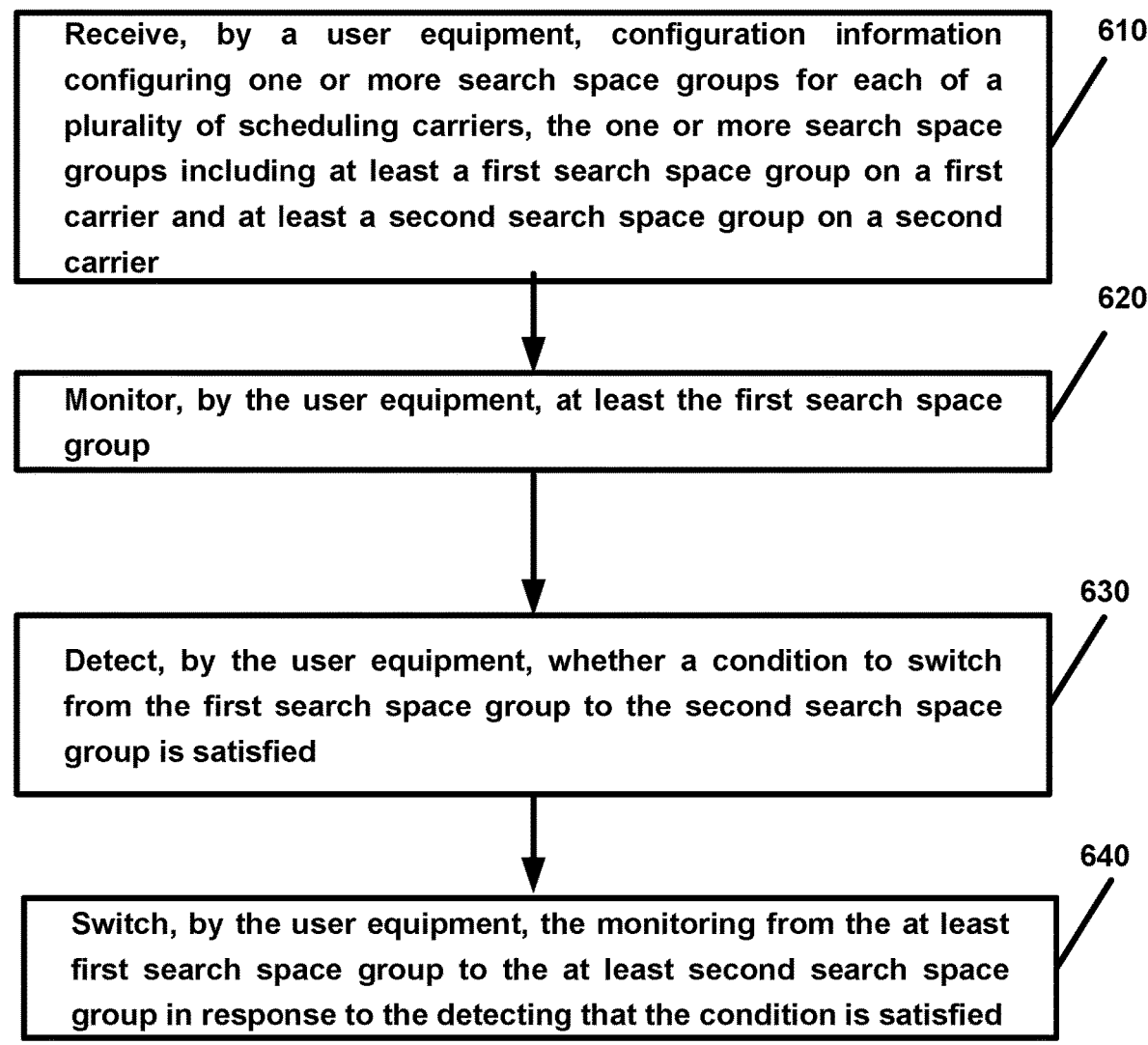
FIG. 6 is a flow chart illustrating time domain adaptation multi-carrier PDDCH monitoring mechanism, according to an example implementation.

FIG. 6 is a flow chart 600 illustrating time domain adaptation of multi-carrier PDDCH monitoring mechanism, according to an example implementation.

In an example implementation, at block 610, UE 204 may receive configuration information configuring one or more search space groups for each of a plurality of scheduling carriers. In some implementations, for example, the one or more search space groups may include at least a first search space group on a first carrier and at least a second search space group on a second carrier. In an example implementation, the configuration information may be received via RRC signaling.

At block 620, the UE may monitor at least the first search space group.

At block 630, the UE may detect whether a condition to switch from the first search space group to the second search space group is satisfied. In some implementations, for example, the condition to switch may include determining that the user equipment is not detecting a pre-defined signal or a channel on a scheduling carrier during a measurement occasion of the scheduled carrier, or determining that the user equipment is detecting or reporting a channel quality indicator below a threshold value during the measurement occasion of the scheduled carrier, or determining that the user equipment is detecting a radio link failure of a physical downlink control channel during a measurement occasion of another scheduled carrier.

In addition, in some implementations, for example, the UE may perform the switching if the UE detects that the gNB is not transmitting a signal, for example, due to Listen Before Talk (LBT) failure.

At block 640, the UE may switch the monitoring from the at least first search space group to the at least second search space group. In some implementations, the UE may perform the switching in response to the detecting that the condition is satisfied.

Thus, the above described mechanisms provide for time domain adaptation of multi-carrier PDDCH monitoring mechanism.

Figure 7:
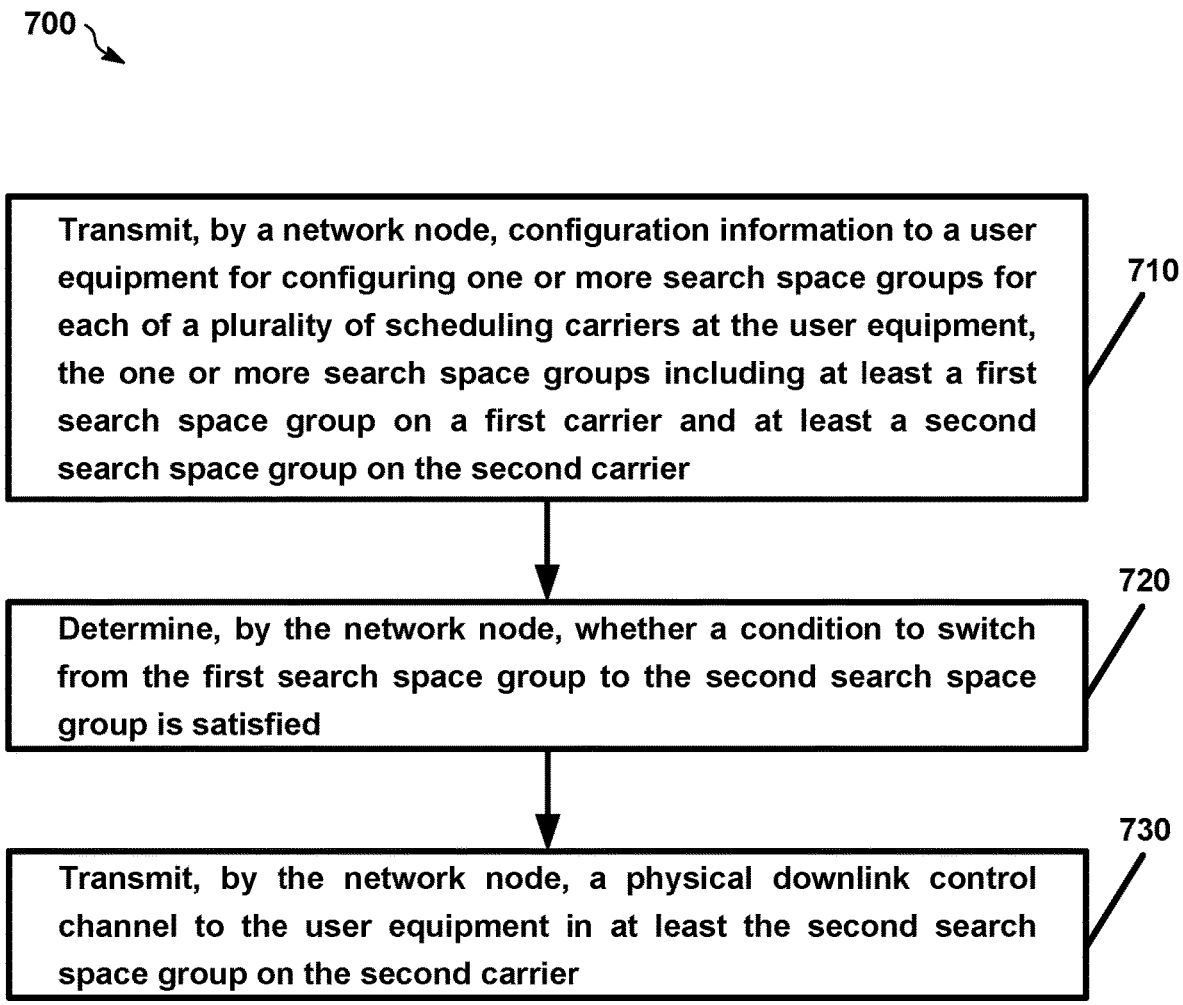
FIG. 7 is a flow chart illustrating time domain adaptation multi-carrier PDDCH monitoring mechanism, according to an example implementation.

FIG. 7 is a flow chart 700 illustrating time domain adaptation of multi-carrier PDDCH monitoring mechanism, according to an example implementation.

In an example implementation, at block 710, a gNB, e.g., gNB 202 may transmit configuration information to a user equipment, e.g., UE 204. In some implementations, for example, the configuration information transmitted by the gNB may include information for configuring one or more search space groups for each of a plurality of scheduling carriers at the user equipment. The one or more search space groups may include at least a first search space group on a first carrier and at least a second search space group on the second carrier.

At block 720, the gNB may determine whether a condition to switch from the first search space group to the second search space group is satisfied.

At block 730, the gNB may transmit a physical downlink control channel to the user equipment in at least the second search space group on the second carrier.

Optionally, in some implementations, for example, the gNB may receive feedback from the user equipment. In some implementations, for example, the feedback may include ACK/NACK, etc. In some implementations, the gNB may determine whether the condition to switch from the first search space group to the second search space group is satisfied based at least partially on the feedback from the user equipment.

Thus, the above described mechanisms provide for time domain adaptation of multi-carrier PDDCH monitoring mechanism.

In some implementations, for example, the dropping of SS sets may happen on a scheduling cell level or a search space set level depending on, e.g., if priorities for different SS within the same cell are set equally or differently. In addition, in some implementations, for example, some second priority cell's SS sets may be monitored as well.

Additional example implementations are described herein.

Example 1. A method of communications, comprising: receiving, by a user equipment, configuration information configuring one or more search space groups for each of a plurality of scheduling carriers, the one or more search space groups including at least a first search space group on a first carrier and at least a second search space group on a second carrier; monitoring, by the user equipment, at least the first search space group; detecting, by the user equipment, whether a condition to switch from the first search space group to the second search space group is satisfied; and switching, by the user equipment, the monitoring from the at least first search space group to the at least second search space group in response to the detecting that the condition is satisfied.

Example 2. The method of Example 1, wherein the configuration information is received via radio resource control (RRC) signaling.

Example 3. The method of any of Examples 1-2, wherein a search space group of the one or more search space groups includes a plurality of search spaces.

Example 4. The method of any of Examples 1-3, wherein a search space of the plurality of search spaces is a common search space or a user equipment-specific search space.

Example 5. The method of any of Examples 1-4, wherein the user equipment is scheduled with at least one of self-scheduling or cross-carrier scheduling across the first and second scheduling carriers, and wherein the at least one of self-scheduling or cross-carrier scheduling includes one or more of: scheduling of the first scheduling carrier via the first scheduling carrier; scheduling of the first scheduling carrier via the second scheduling carrier; scheduling of the second scheduling carrier via the second scheduling carrier; and scheduling of the second scheduling carrier via the first scheduling carrier.

Example 6. The method of any of Examples 1-4, wherein the plurality of scheduling carriers includes a first scheduling carrier and at least two second scheduling carriers, wherein the user equipment is scheduled with at least one of self-scheduling or cross-carrier scheduling across the first and the at least two second scheduling carriers, and wherein the at least one of self-scheduling or cross-carrier scheduling includes one or more of: scheduling of the first scheduling carrier via the first scheduling carrier; scheduling a scheduling carrier of the at least two second scheduling carriers using the scheduling carrier of the at least two second scheduling carriers; scheduling of the first scheduling carrier via one of the at least two second scheduling carriers; scheduling of at least one of the at least two second scheduling carriers via the first scheduling carrier; and scheduling of at least one of the at least two second scheduling carriers via another of the at least two second scheduling carriers.

Example 7. The method of any of Examples 1-6, wherein each of the plurality of scheduling carriers are configured with corresponding search space monitoring patterns and associated priorities.

Example 8. The method of Example 7, wherein the search space monitoring patterns include physical downlink control channel monitoring occasions.

Example 9. The method of any of Examples 1-8, further comprising: determining a scheduling carrier to be used for the monitoring based at least on the associated priorities of the plurality of scheduling carriers.

Example 10. The method of any of Examples 1-9, wherein the monitoring is performed such that blind decoding and/or control channel element limits are not exceeded.

Example 11. The method of any of Examples 1-10, wherein the condition includes one or more of: determining that the user equipment is not detecting a pre-defined signal or a channel on a scheduling carrier during a measurement occasion of the scheduled carrier; determining that the user equipment is detecting or reporting a channel quality indicator below a threshold value during the measurement occasion of the scheduled carrier; and determining that the user equipment is detecting a radio link failure of a physical downlink control channel during a measurement occasion of another scheduled carrier.

Example 12. The method of any of Examples 1-11, wherein: the user equipment is in radio resource control (RRC) connected state, or the user equipment is configured with carrier aggregation, or a combination thereof.

Example 13. A method of communications, comprising: transmitting, by a network node, configuration information to a user equipment for configuring one or more search space groups for each of a plurality of scheduling carriers at the user equipment, the one or more search space groups including at least a first search space group on a first carrier and at least a second search space group on the second carrier; determining, by the network node, whether a condition to switch from the first search space group to the second search space group is satisfied; and transmitting, by the network node, a physical downlink control channel to the user equipment in at least the second search space group on the second carrier.

Example 14. The method of Example 14, wherein the determining is performed at least partially based on a feedback from the user equipment.

Example 15. An apparatus comprising: at least one processor; and at least one memory including computer program code, the at least one memory and the computer program code configured to, with the at least one processor, cause the apparatus at least to perform the method of any of Examples 1-14.

Example 16. A non-transitory computer-readable storage medium comprising instructions stored thereon that, when executed by at least one processor, are configured to cause a computing system to perform the method of any of Examples 1-14.

Figure 8:
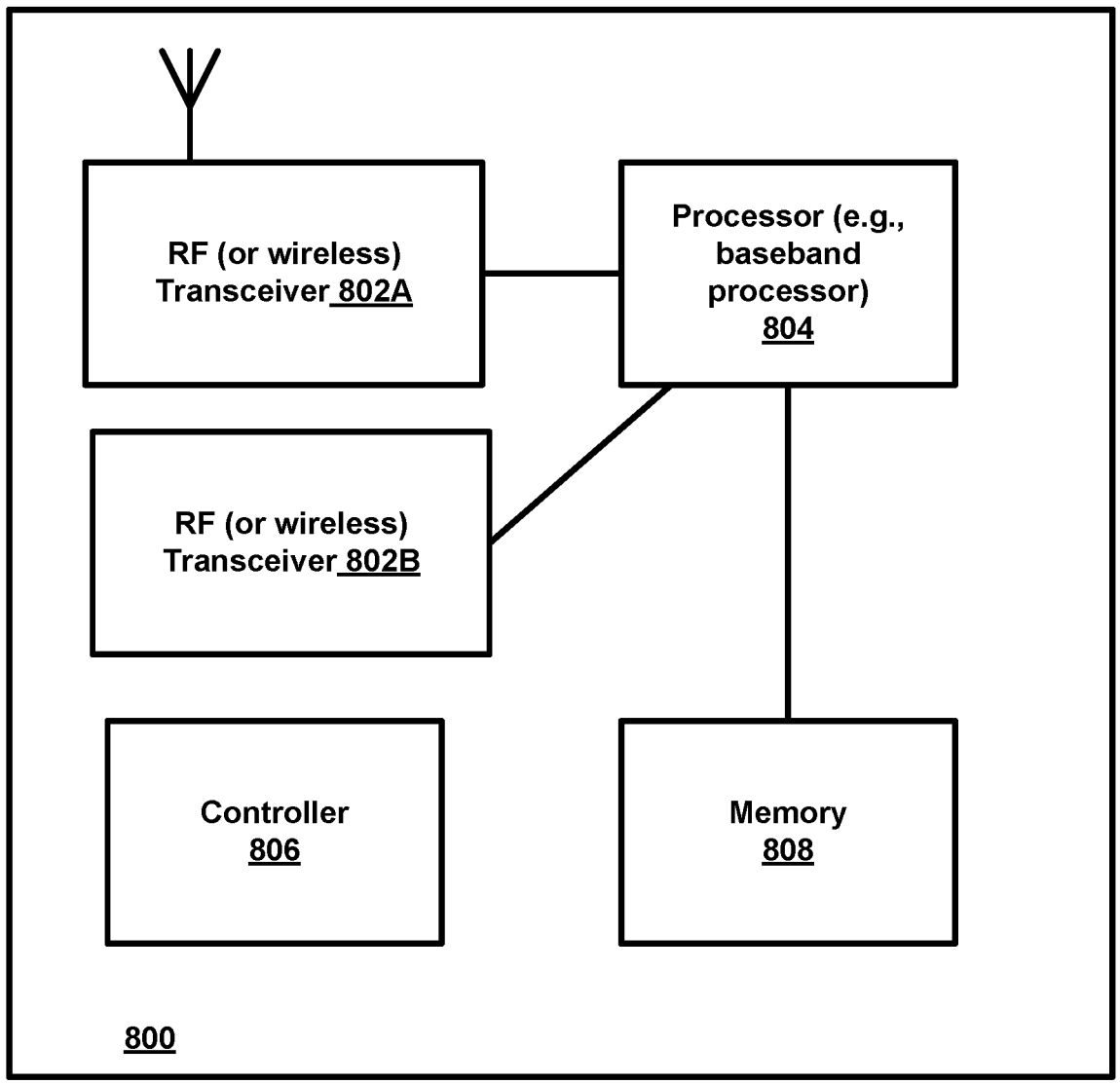
FIG. 8 is a block diagram of a node or wireless station (e.g., base station/access point or mobile station/user device/UE), according to an example implementation.

FIG. 8 is a block diagram of a wireless station (e.g., user equipment (UE)/user device or AP/gNB/MgNB/SgNB) 800 according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/806 to execute instructions or software and control transmission and receptions of signals, and a memory 808 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller 806 (or processor 804) may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. An apparatus comprising:
at least one processor; and
at least one memory including instructions,
wherein the apparatus is in a radio resource control (RRC) connected state,
wherein the apparatus is configured with carrier aggregation, and
wherein the at least one memory including the instructions is configured to, with the at least one processor, cause the apparatus at least to:
    establish a slot-based time grid using a subcarrier spacing of at least one of a primary cell or one or more secondary cells;
    receive, via RRC signaling, configuration information configuring one or more search space groups for the primary cell and the one or more secondary cells, the one or more search space groups including at least a first search space group and at least a second search space group, wherein each of the primary cell and the one or more secondary cells are configured with corresponding search space monitoring patterns and associated priorities, wherein the search space monitoring patterns include physical downlink control channel monitoring occasions, and wherein the search space monitoring patterns are mapped to the slot-based time grid;
    monitor at least the first search space group on a secondary cell configured for scheduling the primary cell, wherein the monitoring is performed such that blind decoding and control channel element limits are not exceeded;
    detect whether a condition to switch from the first search space group to the second search space group is satisfied, wherein the condition includes:
        detecting neither of a pre-defined signal nor a channel on a scheduling cell during a measurement occasion of the scheduling cell;
        determining whether a channel quality indicator is below a threshold value during a measurement occasion of the scheduling cell;
        detecting a radio link failure of a physical downlink control channel during a measurement occasion of another scheduling cell; and
        detecting that a network node is not transmitting due to a Listen Before Talk (LBT) failure;
    switch the monitoring from the at least first search space group to the second search space group in response to the detecting that the condition is satisfied; and
    determine the secondary cell as a scheduling cell to be used for the monitoring based at least on associated priorities of the primary cell and the one or more secondary cells.

* * * * *